J. PARK.
CUTTING MACHINE.
APPLICATION FILED MAY 5, 1917.

1,243,969.

Patented Oct. 23, 1917.

Witness

Inventor
James Park
By C. A. Snow & Co.
Attorney

UNITED STATES PATENT OFFICE.

JAMES PARK, OF HOPKINS, MINNESOTA.

CUTTING-MACHINE.

1,243,969. Specification of Letters Patent. Patented Oct. 23, 1917.

Application filed May 5, 1917. Serial No. 166,655.

*To all whom it may concern:*

Be it known that I, JAMES PARK, a citizen of the United States, residing at Hopkins, in the county of Hennepin and State of Minnesota, have invented a new and useful Cutting-Machine, of which the following is a specification.

The subject of this invention is a cutting machine adapted for cutting plastic materials such as concrete blocks and the like, and the objects of the invention are, first, to provide means for cutting a tongue and groove in a plastic block, second, to provide a cutter which will cut a tongue and groove of arc shape, third, to provide means for accurately locating the block to be cut, fourth, to provide a simple and efficient cutter.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein:—

Referring to the drawing by numerals:—

Figure 1:
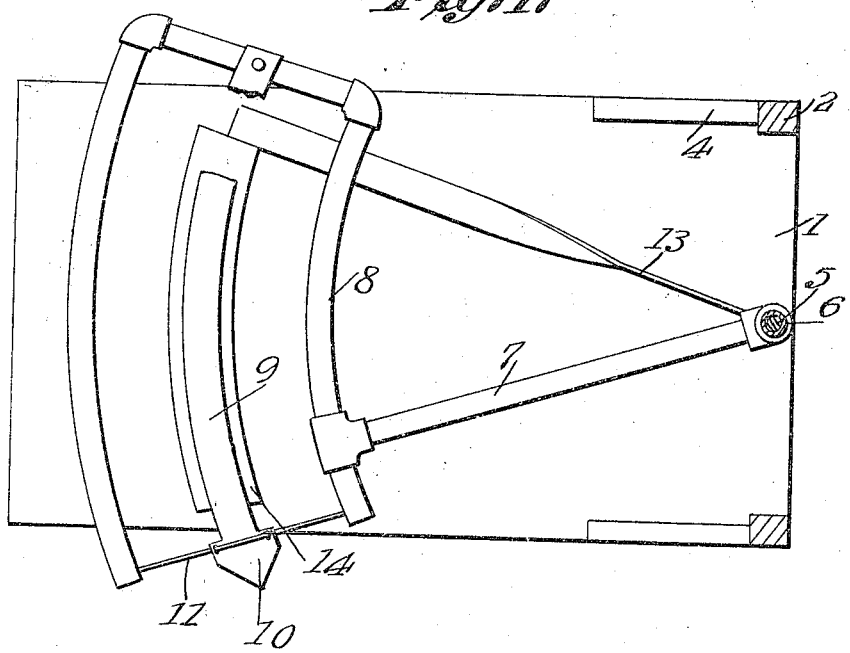
Figure 1 is a plan view of a cutter constructed in accordance with my invention, portions broken away.
Figure 2:
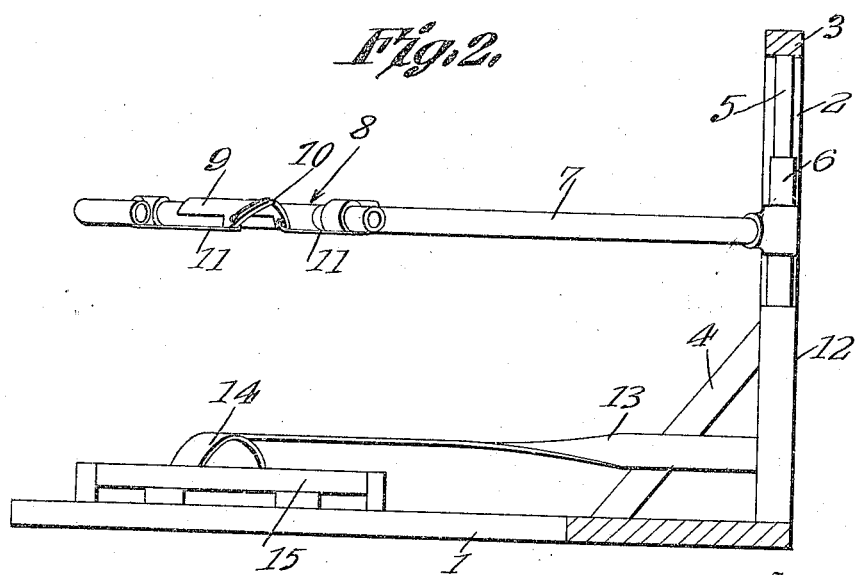
Fig. 2 is a front elevation partly in section.

A base plate 1, from which rises corner uprights 2, with the cross bar 3 and struts 4, constitute the main support of the device. Stepped in the base plate 1 and having its upper end secured in the cross bar 3 is a vertical rod 5. A hollow shaft 6 turns on the vertical rod 5 and carries a laterally extending arm 7.

Secured to the free end of the arm 7 is a horizontally disposed, yoke like frame 8 the side arms of which are curved to form arcs of concentric circles whose center lies in the axis of the rod 5. Secured to the cross bar of the frame 8 and midway between the side arms is a cutting element 9 which is curved in an arc concentric with the side arms. The cutting element is preferably formed with an arrow head cutting end 10, as shown. A cutting wire 11 is supported between the ends of the side arms of the frame 8 and the cutting head 10.

A sleeve 12 surrounds the hollow shaft 6 near its base and is formed with a laterally extending arm 13 at the end of which is secured an arcuate, transversely curved member 14 which is adapted to the groove cut by the cutting element 9.

A pallet 15 is indicated as resting on the base 1 and in position to support the member 14. This pallet serves as a support for the plastic block, such as soft, unset concrete or the like.

The device is used principally for cutting curved blocks formed for use in building silos or other structures wherein curved surfaces are formed. The blocks of concrete are formed in the usual molds and then placed on the cutter and the blocks cut to the desired lengths with a tongue and groove formed on each block. This cutting operation is carried out by grasping the cross bar of the frame 8 and swinging the frame forward toward the block, which will be cut by the head 10 of the cutting element 9, which forms the tongue and groove, and the wire 11.

Having described my invention, what I claim as new and desire to secure by Letters Patent, is:—

1. A cutting machine, comprising a support, an arm swung in the support, a frame carried by the arm, a curved cutting element secured in the frame, and straight cutting edges supported by the curved cutting element and the frame.

2. A cutting machine, comprising a support, an arm swinging in the support, a horizontally arranged frame carried by the arm, and a cutting element in the frame and arranged to travel in an arc.

3. A cutting machine, comprising a support, an arm swinging in the support, a yoke shaped frame carried by the arm, a curved cutting element in the frame, another arm swinging in the frame, and a work locating member carried by the latter arm.

In testimony that I claim the foregoing as my own, I have hereto affixed my signature in the presence of two witnesses.

JAMES PARK.

Witnesses:
C. O. NYMOEN,
T. PESHELL.

Copies of this patent may be obtained for five cents each, by addressing the "Commissioner of Patents, Washington, D. C."